(12) United States Patent
Gammel et al.

(10) Patent No.: US 9,779,566 B2
(45) Date of Patent: Oct. 3, 2017

(54) RESOURCE MANAGEMENT BASED ON PHYSICAL AUTHENTICATION AND AUTHORIZATION

(71) Applicant: Schweitzer Engineering Laboratories, Inc., Pullman, WA (US)

(72) Inventors: Dennis Gammel, Pullman, WA (US); George W. Masters, Moscow, ID (US); Kylan T. Robinson, Colton, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 106 days.

(21) Appl. No.: 14/823,219

(22) Filed: Aug. 11, 2015

(65) Prior Publication Data

US 2017/0046895 A1 Feb. 16, 2017

(51) Int. Cl.
G07C 9/00 (2006.01)
H04W 4/00 (2009.01)
H04W 4/08 (2009.01)

(52) U.S. Cl.
CPC ..... *G07C 9/00134* (2013.01); *G07C 9/00174* (2013.01); *G07C 9/00571* (2013.01); *H04W 4/008* (2013.01); *H04W 4/08* (2013.01); *G07C 9/0069* (2013.01); *G07C 2209/04* (2013.01)

(58) Field of Classification Search
None
See application file for complete search history.

(56) References Cited

U.S. PATENT DOCUMENTS

| | | | |
|---|---|---|---|
| 6,738,628 B1 | 5/2004 | McCall |
| 7,012,503 B2 | 3/2006 | Nielsen |
| 7,205,882 B2 | 4/2007 | Libin |
| 7,323,991 B1 | 1/2008 | Eckert |
| 7,353,396 B2 | 4/2008 | Micali |
| 7,616,091 B2 | 11/2009 | Libin |
| 7,848,905 B2 | 12/2010 | Troxler |
| 8,108,914 B2 | 1/2012 | Hernoud |

(Continued)

FOREIGN PATENT DOCUMENTS

| | | |
|---|---|---|
| WO | 2010067205 | 6/2010 |
| WO | 2014029774 | 2/2014 |

OTHER PUBLICATIONS

Robinson et al. RFID Smart Home: Access Control and Automated-Lightning System, Oct. 23, 2008, pp. iii and 4-17.*

(Continued)

*Primary Examiner* — Daniell L Negron
(74) *Attorney, Agent, or Firm* — John P. Davis; Richard M. Edge

(57) ABSTRACT

Systems and methods are disclosed that provide for management of resources of one or more systems included in an access-controlled area of a distributed site of an electric power delivery system. In certain embodiments, one or more users entering and access-controlled area may be identified via physical access control credentials provided to an associated access control system. A determination may be made as to whether the users have access rights to one or more hardware and/or software resources of systems included in the access-controlled area. Based on the determination, control signals may be generated by the access control system to enable and/or disable associated resources.

20 Claims, 7 Drawing Sheets

(56) References Cited

U.S. PATENT DOCUMENTS

| | | |
|---|---|---|
| 8,407,775 B2 | 3/2013 | Conlin |
| 8,446,249 B2 | 5/2013 | Gerstenkorn |
| 8,482,378 B2 | 7/2013 | Sadighi |
| 8,494,576 B1 | 7/2013 | Bye |
| 8,994,498 B2 | 3/2015 | Agrafioti |
| 2008/0173709 A1 | 7/2008 | Ghosh |
| 2010/0201230 A1 | 8/2010 | Schweitzer |
| 2012/0208549 A1 | 8/2012 | Lau |
| 2012/0280790 A1 | 11/2012 | Gerhardt |
| 2013/0237193 A1 | 9/2013 | Dumas |
| 2013/0257589 A1 | 10/2013 | Mohiuddin |
| 2014/0121858 A1 | 5/2014 | Chen |
| 2014/0150502 A1 | 6/2014 | Duncan |
| 2014/0266585 A1* | 9/2014 | Chao .................. G07C 9/00111 340/5.61 |
| 2015/0221152 A1 | 8/2015 | Andersen |

OTHER PUBLICATIONS

PCT/US2015/038622 Patent Cooperation Treaty, International Search Report and Written Opinion of the International Searching Authority, dated Sep. 30, 2015.

\* cited by examiner

ID
RESOURCE MANAGEMENT BASED ON PHYSICAL AUTHENTICATION AND AUTHORIZATION

FEDERALLY SPONSORED RESEARCH OR DEVELOPMENT

This invention was made with U.S. Government support under Contract No.: DOE-OE0000680. The U.S. Government may have certain rights in this invention.

TECHNICAL FIELD

This disclosure relates to systems and methods for managing resources and, more particularly, to systems and methods for managing resources of one or more systems included in an access-controlled area of a distributed site of an electric power delivery system.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

Figure 1:
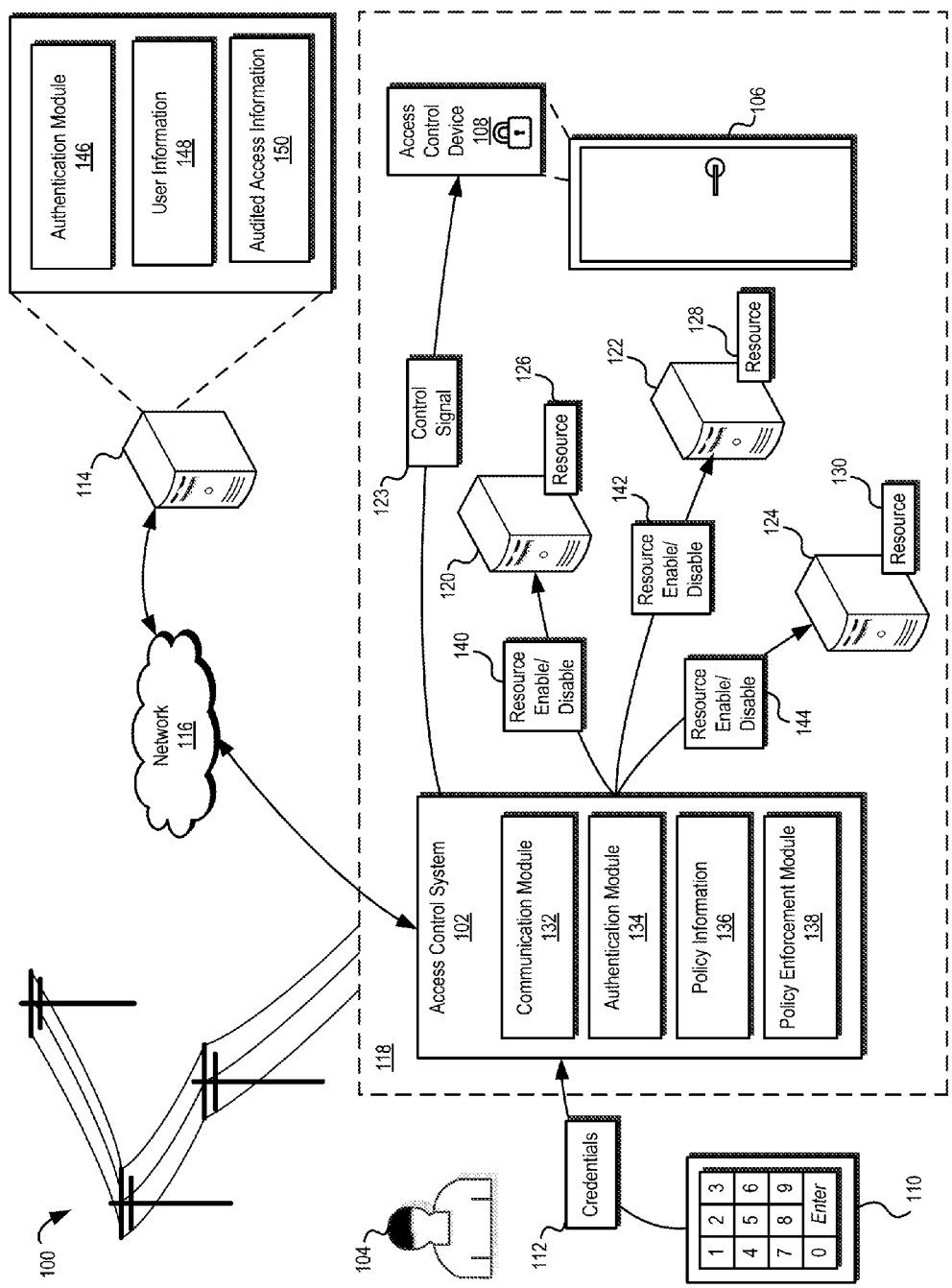
FIG. 1 illustrates an example of a resource management architecture consistent with embodiments disclosed herein.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Electrical power generation and delivery systems are designed to generate, transmit, and distribute electrical energy to loads. Electrical power generation and delivery systems may include a variety of equipment, such as electrical generators, electrical motors, power transformers, power transmission and distribution lines, circuit breakers, switches, buses, transmission and/or feeder lines, voltage regulators, capacitor banks, and/or the like. Such equipment may be monitored, controlled, automated, and/or protected using intelligent electronic devices ("IEDs") that receive electric power system information from the equipment, make decisions based on the information, and provide monitoring, control, protection, and/or automation outputs to the equipment.

In some embodiments, an IED may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communication processors, computing platforms, programmable logic controllers ("PLCs"), programmable automation controllers, input and output modules, governors, exciters, statcom controllers, access control systems, SVC controllers, OLTC controllers, and the like. Further, in some embodiments, IEDs may be communicatively connected via a network that includes, for example, multiplexers, routers, hubs, gateways, firewalls, and/or switches to facilitate communications on the networks, each of which may also function as an IED. Networking and communication devices may also be integrated into an IED and/or be in communication with an IED. As used herein, an IED may include a single discrete IED or a system of multiple IEDs operating together.

Certain equipment associated with an electrical power generation and delivery system may be distributed in one or more sites and/or locations. For example, a variety of equipment (e.g., IEDs, network equipment, and/or the like) may be associated with a distribution substation location of an electric power delivery system. In some circumstances, distributed sites of an electrical power generation and delivery system may be located in relatively remote and/or infrequently accessed locations. For example, certain distributed sites may be accessed infrequently by individuals performing maintenance, diagnostic, and/or repair activities on equipment associated with the sites (e.g., utility and/or other service personnel).

To ensure the physical security of a distributed site and/or associated equipment, a distributed site may include one or more access control devices including, for example, locks (e.g., electromagnetic, mechanical, and/or solenoid locks), tamper protection devices, security-hardened buildings, enclosures, and/or utility boxes, alarm systems, and/or the like. An access control system in communication with the one or more access control devices may be configured to allow personnel wishing to access the distributed site to authenticate their identity and/or their rights to physically access an associated access-controlled area of the distributed site and/or associated equipment. Based on a successful authentication, the access control system may issue one or more control signals to associated physical access control devices configured to allow the personnel physical access to the access-controlled area of the distributed site and/or associated equipment (e.g., by issuing a control signal configured to disengage a solenoid lock, an alarm system, and/or the like). In some embodiments, the access control system and/or associated devices may establish a secure access-controlled boundary associated with the distributed site.

Various equipment associated with an electrical power generation and delivery system may comprise and/or otherwise be associated with one or more resources. As used herein, a resource may include any component, subcomponent, system, and/or subsystem associated with and/or otherwise included in a piece of equipment, any functionality associated with the equipment, and/or any other feature and/or process implemented by the equipment. In certain embodiments, resources may comprise hardware and/or software resources. For example, a resource may comprise, without limitation, a physical interface such as a port, a wireless access device, a human machine interface ("HMI") such as a button, a switch, a status light, a display, and/or the like. In further embodiments, a resource may comprise a particular processing environment included in a piece of requirement (e.g., a secure processing environment and/or the like), a particular software process, a graphical user interface, a thread, and/or application executed by the equipment, access to a particular database and/or other information stored and/or otherwise managed by a piece of equipment and/or the like.

An organization managing an access-controlled area of a distributed site may wish to manage rights to access and/or otherwise use various resources associated with equipment in the access-controlled area based, at least in part, on the identity of an associated user. For example, a utility may wish to restrict access to and/or otherwise use of a certain set of resources associated with equipment included in an access-controlled area of a distributed site to a certain subset of users having authorized physical access to the access-controlled area (e.g., only to authorized service technicians and/or technicians having a requisite level of seniority and/or training). Similarly, physical and electronic security requirements associated with a distributed site may require that certain functions and/or software applications associated with equipment in the site are only accessible by a set of authorized users.

Consistent with embodiments disclosed herein, access to and/or use of various resources associated with certain equipment included in an access-controlled area of a distributed site may be managed based, at least in part, on authenticated physical access to the distributed site. To authenticate rights to physically access an access-controlled area, a user may provide an associated access control system with one or more credentials uniquely identifying the user. Based on such credentials, an identity of the user may be determined. Consistent with embodiments disclosed herein, one or more resources within the access-controlled area may be managed (e.g., enabled and/or disabled) based on the identity of the user. In certain embodiments, such resource management may be based on one or more articulated policies associating users with one or more resources (e.g., identity-based policies, role-based policies, temporal-based policies, condition-based policies, etc.).

Several aspects of the embodiments described herein are illustrated as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions. In some embodiments, the computer or other electronic device may include a processing device such as a microprocessor, microcontroller, logic circuitry, or the like. The processing device may further include one or more special purpose processing devices such as an application specific interface circuit ("ASIC"), PAL, PLA, PLD, field programmable gate array ("FPGA"), or any other customizable or programmable device.

FIG. 1 illustrates an example of a resource management architecture 100 consistent with embodiments disclosed herein. In certain embodiments, an access control system 102 may be associated with an access-controlled area 118 of a distributed site of an electric power generation and delivery system. Consistent with embodiments disclosed herein, the access control system 102 may be configured to manage physical access to the access-controlled area 118 and/or resources 126-130 located within the access-controlled area 118. Although illustrated in connection with an access-controlled area 118 of a distributed site of an electric power generation and delivery system, it will be appreciated that embodiments of the disclosed systems and methods may be utilized in connection with resources in a variety of access-controlled areas. Similarly, although illustrated in connection with a single access-controlled area 118 layer, it will be appreciated that embodiments of the disclosed systems and methods may further be utilized in connection with multiple physical access controlled layers (e.g., as may be the case in connection with layered access-controlled areas).

The access-controlled area 118 may include a variety of equipment 120-124 associated with the electric power generation and delivery system including, for example, one or more IEDs, network communication equipment, electrical generators, electrical motors, power transformers, power transmission and distribution lines, circuit breakers, switches, buses, transmission and/or feeder lines, voltage regulators, capacitor banks, computer systems, and/or the like. In certain embodiments, the access-controlled area 118 may comprise a subset of equipment 120-124 associated with a distributed location of an electric power generation and/or delivery system (e.g., a portion of a distribution substation). For example, in some embodiments, the access-controlled area 118 may comprise a distribution substation of an electric power delivery system. In further embodiments, the access-controlled area 118 may comprise a panel and/or utility box housing equipment associated with an electrical power generation and/or delivery system.

Equipment 120-124 included in the access-controlled area 118 may comprise and/or otherwise be associated with one or more resources 126-130. Although each piece of equipment 120-124 is illustrated as being associated with a single resource 126-130, it will be appreciated that a piece of equipment 120-124 may be associated with any number of resources 126-130. In further embodiments, a resource may be included in the access-controlled area that is not associated with and/or otherwise included in a piece of equipment (not shown).

Resources 126-130 may comprise any component, sub-component, system, and/or subsystem associated with and/or included in a piece of equipment 120-124, any functionality associated with the equipment 120-124, and/or any other feature and/or process implemented by the equipment 120-124, and may comprise any of the types of resources 126-130 described herein. For example, resource 126 associated with equipment 120 may comprise a port interface, resource 128 associated with equipment 122 may comprise a human machine interface (e.g., a display, a status indicator light, and/or the like), and resource 130 associated with equipment 124 may comprise a software application and/or a particular feature and/or function of a software application executing on the equipment 124. It will be appreciated that a wide variety of resources 126-130 may be included in and/or be otherwise associated with equipment 120-124 within an access-controlled area 118 in connection with the disclosed embodiments.

Physical access to the access-controlled area 118 and/or equipment 120-124 associated with the same may be facilitated via one or more access points 106. As illustrated, the access point 106 may comprise a door to a building associated with the access-controlled area 118. In further embodiments, the access point 106 may include one or more panels and/or boxes facilitating access to equipment 120-124 housed therein. In yet further embodiments, the access point 106 may be associated with a particular piece of equipment (e.g., an IED or the like) within the access-controlled area 118. For example, the access point 106 may comprise an access panel to a particular piece of equipment within the access-controlled area 118.

Physical access by a user 104 to the access-controlled area 118 using the one or more access points 106 may be managed by one or more access control devices 108 associated with an access point 106. In certain embodiments, an access control device 108 may be controlled by the access control system 102. The access control devices 108 may comprise one or more locks (e.g., electromagnetic, mechanical, and/or solenoid locks), alarm systems, and/or the like. For example, in certain embodiments, an access control device 108 may comprise an electronically actuated lock for a door.

The access control system 102, an associated authentication service 114 and/or other associated systems (e.g., equipment 120-124) may comprise any suitable computing system or combination of systems configured to implement embodiments of the systems and methods disclosed herein. In certain embodiments, the access control system 102, the authentication service 114, the equipment 120-124 and/or other associated systems may comprise at least one processor system configured to execute instructions stored on an associated non-transitory computer-readable storage medium. In some embodiments, the access control system 102, the authentication service 114, the equipment 120-124 and/or other associated systems may further comprise secure execution space configured to perform sensitive operations such as authentication credential validation, policy management and/or enforcement, and/or other aspects of the systems and methods disclosed herein. The access control system 102, the authentication service 114, the equipment 120-124 and/or other associated systems may further comprise software and/or hardware configured to enable electronic communication of information between the systems 102, 114, 120-124 via one or more associated network connections (e.g., network 116).

The control system 102, the authentication service 114, the equipment 120-124 and/or other associated systems may comprise a computing device executing one or more applications configured to implement embodiments of the systems and methods disclosed herein. In certain embodiments, the control system 102, the authentication service 114 and/or other associated systems may comprise a laptop computer system, a desktop computer system, an IED, a server computer system and/or any other computing system and/or device that may be utilized in connection with the disclosed systems and methods.

The various systems 102, 114, 120-124 may communicate via one or more networks comprising any suitable number of networks and/or network connections. For example, as illustrated, the access control system 102 may communicate with the authentication service 114 via network 116. The network connections may comprise a variety of network communication devices and/or channels and may utilize any suitable communication protocols and/or standards facilitating communication between the connected devices and systems. The network connections may comprise the Internet, a local area network, a virtual private network, and/or any other communication network utilizing one or more electronic communication technologies and/or standards (e.g., Ethernet or the like). In some embodiments, the network connections may comprise a wireless carrier system such as a personal communications system ("PCS"), and/or any other suitable communication system incorporating any suitable communication standards and/or protocols. In further embodiments, the network connections may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network connections may incorporate one or more satellite communication links. In yet further embodiments, the network connections may utilize IEEE's 802.11 standards (e.g., Wi-Fi®), Bluetooth®, ultra-wide band ("UWB"), Zigbee®, and/or any other suitable communication protocol(s).

Consistent with embodiments disclosed herein, a user 104 may communicate with the access control system 102 via one or more interfaces 110 (e.g., keypads, buttons, biometric scanners, badge scanners, and/or the like) to authenticate physical access to the access-controlled area 118. In certain embodiments, the interface may comprise a touchscreen, a keyboard, a mouse, a track pad, and/or any other suitable interface associated with the access control system 102. For example, the interface 110 may comprise a physical key and/or electronic 10-digit key pad (e.g., a keypad displayed on a touchscreen interface).

Using the one or more interfaces 110 associated with the access control system 102, the user 104 may enter authentication credentials 112 for authenticating their rights to physically access the access-controlled area 118. For example, a user 104 may provide the access control system 102 with authentication credentials 112 such as a personal identification number ("PIN") or the like via a keypad interface 110. The authentication credentials may comprise any type of numeric (e.g., a PIN), alphanumeric, symbolic, and/or other type of authentication credentials. In further embodiments, the authentication credentials may comprise a biometric sensor input, information received from a security key or card in communication with the interface (e.g., using a near field communication ("NFC") standard), and/or the like. It will be appreciated that a variety of types of authentication credentials and associated interfaces may be used in connection with the disclosed embodiments.

After receiving the credentials 112, the access control system 102 and/or a remote authentication service may authenticate the validity of the credentials 112 using an authentication module 134 executing thereon to determine whether the user 104 has rights to physically access the access-controlled area. The authentication module 134 may comprise software and/or hardware configured to authenticate the validity of the authentication credentials 112 provided to the physical access control system 102, determine whether a user 104 associated with the credentials 112 has current rights to physically access the access-controlled area 118, and/or issue one or more responses and/or control signals 123 in connection with the same. For example, in certain embodiments, the credential authentication module 134 may compare a PIN included in the authentication credentials 112 with known PINs associated with personnel having current access rights to the access-controlled area 118. If the PIN included in the authentication credentials 112 is a known PIN associated with personnel having current access rights to the access-controlled area 118, the access control system 102 may issue a control signal 123 to an access control device 108 associated with an access point 106 of the access-controlled area 118. For example, in certain embodiments, the control signal 123 may actuate a lock associated with the access point 106, may disable an alarm system associated with the access point 106, and/or the like. In further embodiments, a response indicating a successful authentication of the authentication credentials may be communicated from the access control system 102 to an associated interface 110 and/or a remote authentication service 114.

In some embodiments, certain aspects of a credential authentication process may involve a remote authentication service 114 communicatively coupled to the access control system 102 (e.g., via and/or network 116). In certain embodiments, communication between the access control system 102 and one or more other systems (e.g., remote authentication service 114, access control device 108, and/or equipment 120-124) may be facilitated, at least in part, by a communication module 132 executing on the access control system 102. For example, the access control system 102 may communicate authentication credentials 112 provided by a user 104 (e.g., via an interface 110 or the like) to the remote authentication service 114. A remote service authentication module 146 may make an authentication decision based on the authentication credentials 112 and/or other user information 148 managed by the authentication service 114 (e.g., known PINs associated with personnel having access rights). For example, the authentication service 114 may compare a PIN included in the authentication credentials 112 provided by the user 104 with known PINs associated with personnel having current access rights to the access-controlled area 118. Based on the results of the determination, the authentication service 114 may communicate a response to the access control system 102 indicating whether the authentication credentials were authenticated by the service 114.

In certain embodiments, the access control system 102 may implement multi-factor authentication processes (e.g., a two-factor authentication process) in connection with managing physical access to the access-controlled area 118. In certain embodiments, authentication processes consistent with embodiments disclosed herein may include, without limitation, knowledge factor authentication (e.g., demonstrating knowledge of a password, a passphrase, a PIN, a challenge response, a pattern, etc.), ownership or possession factor authentication (e.g., demonstrating possession of a security and/or an identification card, a security token, a hardware token, a software token, a security key, etc.), and/or inherence and/or biometric factor authentication (e.g., providing fingerprint, retina, signature, voice, facial recognition, and/or other biometric identifiers), and/or the like.

Upon authenticating and allowing a user 104 physical access to the access-controlled 118, the access control system 102 may manage access to and/or use of resources 126-130 associated with equipment 120-124 within the access-controlled area 118. In some embodiments, the resources 126-130 may be managed based on an identity of the user 104 determined based on the authentication credentials 112. For example, based on the identity of an authenticated user 104, the access control system 102 may enable and/or disable access to and/or use of certain resources 126-130.

In certain embodiments, resources 126-130 may be managed according to one or more articulated policies. Policies may be stored and/or managed by the access control system 102, the remote system 114 and/or any other associated system as part of policy information 136. In certain embodiments, a policy may associate a user and/or a group of users with a resource and/or a set of resources. For example, a policy may articulate which resources 126-130 within the access-controlled area 118 a user 104 or group of users may access and/or otherwise use, how such resources 126-130 may be used, when such resources 126-130 may be used, under what circumstances such resources 126-130 may be used, and/or the like. It will be appreciated that a variety of other types of policies may be articulated, and that any type of policy may be utilized in connection with the disclosed embodiments.

Exemplary policies utilized in connection with the disclosed embodiments may comprise, without limitation, identity-based policies, role-based policies, temporal-based policies, and/or condition-based policies. It will be appreciated that in some embodiments, an articulated policy included in policy information 136 may incorporate any suitable combination of identity, role, temporal, and/or condition-based aspects in connection with resource management consistent with the disclosed embodiments.

In some embodiments, an identity-based policy may specify that one or more specific users are authorized to access and/or otherwise use one or more resources 126-130. For example, an identity-based policy may specify that a particular user (e.g., "User A") has authorization to use resources 126 and 130, but not resource 128.

A role-based policy may specify that users associated with a particular attribute and/or set of attributes are authorized to access and/or otherwise use one or more resources 126-130. In certain embodiments, such an attribute may comprise, for example, group membership information, user role information (e.g., authorized service technician or the like), organization attribute information, and/or the like. For example, a role-based policy may specify that only users associated with an attribute indicating they are a supervisor may access a certain set of resources 126-130 within the access-controlled area 118. In some embodiments, attributes may be stored and/or accessed in user information 148 managed by the remote service 114 and/or the access control system 102, which may be included in and/or used in connection with a directory service for managing computing domain networks associated with the user(s) 104 and/or an organization managing the distributed site.

A temporal-based policy may specify that access to certain resources 126-130 may only be made available to users 104 gaining physical access to the access-controlled area during certain times and/or time periods. For example, in some embodiments, a temporal-based policy may specify that a set of resources 126-130 is accessible to users 104 having authorized physical access to the access-controlled area 118 during standard working hours, but may not be accessible outside the standard working hours even to users otherwise having authorized physical access.

A condition-based policy may specify that access to certain resources 126-130 may depend on satisfaction of one or more conditions. For example, in certain embodiments, a condition-based policy may specify that a set of resources 126-130 is only made accessible when two or more users have authorized their physical access to and are located within the access-controlled area 118. In some embodiments, such a condition-based policy may enforce certain security requirements associated with the distributed site and/or the access-controlled area 118 (e.g., requirements requiring work within the access-controlled area be performed in teams of two or more people, teams comprising a supervisor, and/or the like).

In connection with a policy-enforcement determination regarding whether to authorize access to and/or use one or more resources 126-130 by one or more users 104, one or more control signals 140-144 may be generated by the access control system 102 and/or an associated system. The control signals 140-144 may be communicated to the equipment 120-124 within the access-controlled area 118 and/or associated resources 126-130. In certain embodiments, the control signals 140-144 may be configured to effectuate the policy determination relating to access and/or use of the resources 126-130 by, for example, enabling and/or disabling certain resources 126-130. For example, based on a policy determination relating to a particular user 104, the access control system may enable resources 126 and 128 by providing control signals 140, 142 to associated equipment 120, 122, and may disable resource 130 by providing control signal 144 to associated equipment 124. In this manner, access to and/or use of the resources 126-130 by the user 104 may be managed according to articulated policy information 136 upon authenticating physical access to the access-controlled area 118.

In certain embodiments, data relating to physical access to an access-controlled area 118 and/or associated access and/or use of resources 126-130 within the area 118 may be generated and stored by the access control system 102, the service provider system 114, and/or any other associated system (e.g., stored as audited access information 150 and/or the like). Such audited access information 150 may comprise, without limitation, information regarding which user 104 physically accessed the access-controlled area 118, what resources were accessible to them and/or were used by them, the nature of such use including any information generated during such use, and/or the like. Among other things, audited access information 150 may be utilized in connection with comprehensive physical and cybersecurity management activities relating to the access-controlled area 118.

In some embodiments, if an unauthorized user is detected as having physical access to the access-controlled area 118 (e.g., via an associated security and/or alarm system), embodiments of the disclosed systems and methods may be used to gain forensic information relating to their activities. For example, if an unauthorized user gains physical access to the access-controlled area 118, the policy enforcement module 138 may enforce a computing honeypot. The honeypot may allow the unauthorized user access to honeypot resources including, for example, data, applications, interfaces, and/or network connections that are controlled and/or otherwise isolated from actual system resources and/or functions, while monitoring the user's activities in connection with such honeypot resources. Such forensic information may be stored as part of audited access information 150. In certain embodiments, such a computing honeypot may be enabled and/or otherwise by a policy enforcement module 138 until a user obtains authorized physical access to the access-controlled area 118.

In certain embodiments, audited access information 150 may be generated in accordance with one or more enforced policies that may include any of the policies and/or types of policies disclosed herein. For example, a policy associated with a particular group of users may specify that all information generated through any of the group's users interactions with any of the equipment 120-124 within the access-controlled area 118 are stored as part of audited access information 150. In some embodiments, audited access information 150 may be deleted after a certain period of time (e.g., after a certain period following a user's departure from the access-controlled area 118 or the like).

Embodiments to the disclosed systems and methods may involve a variety of actions to manage resources 126-130 and/or enforce identified policy information 136. For example, as discussed above, in some embodiments, an access control system 102 may issue one or more control signals 140-144 to enable and/or disable an associated resource 126-130. In embodiments where a resource 126-130 comprises an application process and/or a set of processes executing on an associated piece of equipment 120-124, the processes, corresponding threads, and/or other specific process threads may be terminated in connection with a policy-enforcement decision, thereby protecting equipment processing resources and/or data integrity.

In embodiments where a resource 126-130 comprises a communication port and/or any other interface (e.g., a HMI interface), embodiments of the disclosed systems and methods may be utilized to enable such ports and/or interfaces on already operating equipment upon grant of physical access to the access-controlled area 118. In certain embodiments, policy enforcement in connection with the disclosed systems and methods may modify certain software defined network ("SDN") flows within, to, and/or from the access-controlled area 118 from a nominal state.

In certain embodiments, resources comprising ports and/or interfaces may be disabled, enabled and/or otherwise be made available, and/or be reinitialized according to an end-user's specific purpose (e.g., as articulated in associated policy information 136). For example, a specific user 104 may be associated with a set of communication protocols, interfaces, and/or ports, while another user (not shown) may be associated with a different set of protocols, interfaces, and/or ports. Embodiments of the disclosed systems and methods may be utilized to enable and/or disable the set of available protocols, interfaces, and/or ports based on the identity the user determined in connection with a physical access authentication event. In other embodiments, resources 126-130 may comprise certain sets of reports and/or data accessed and/or otherwise generated by equipment 120-124 and may be managed on a user-specific basis based on associated enforced policy information 136. In certain embodiments, certain information associated with a resource 126-130 (e.g., reports, data, processes and/or threads) may not be compiled, aggregated, and/or otherwise correlated until after a user 104 has obtained authorized physical access to the access-controlled area 118 in accordance with associated policy information 136.

In some embodiments, an HMI resource comprising an LED status indicator may be enabled and/or disabled based on the identity of an associated user 104 having authenticated their physical access to the access-controlled area 118. For example, if an engineer in a certain user group (e.g., a group having certain communications permissions) is granted physical access to the access-controlled area 118, the policy enforcement module 138 may identify associated policy information 136 and enforce associated policy to enable LED status indicator resources associated with a physical port link, status, and activity. Similarly, if an engineer in a different user group (e.g., an automatic permission group) is granted physical access to the access-controlled area 118, then the policy enforcement module 138 may enable the same LED status indicator resources to show link, read (Rx) and transmit (Tx) information instead. When unauthorized access is detected, the LED status indicator resources may be shut off showing no information on the associated equipment or equipment's communication state.

In some embodiments, a resource comprising a display interface may change based on the identity of an authenticated user 104. For example, for a first user, the display interface may provide a first set of applications, information, and/or visualizations based on applied policy associated with the first user. For a second user, the display interface may provide a second set of applications, information, and/or visualizations based on applied policy associated with the second user. In this manner, policy enforcement systems and methods consistent with the disclosed embodiments may allow for customization of interface resources provided to users 104 upon authenticating their physical access to an access-controlled area 118.

It will be appreciated that a number of variations can be made to the architecture and relationships presented in connection with FIG. 1 within the scope of the inventive body of work. For example, without limitation, in some embodiments, some or all of the functions performed by the access control system 102 may be performed by the remote authentication service 114 and/or one or more other associated systems. Similarly, some or all of the functions performed by the remote authentication service 114 may be performed by the access control system 102 and/or one or more other associated systems. In further embodiments, physical access control and resource management consistent with the disclosed embodiments may be implemented in any combination of suitable systems. Thus it will be appreciated that the architecture and relationships illustrated in FIG. 1 are provided for purposes of illustration and explanation, and not limitation.

Figure 2:
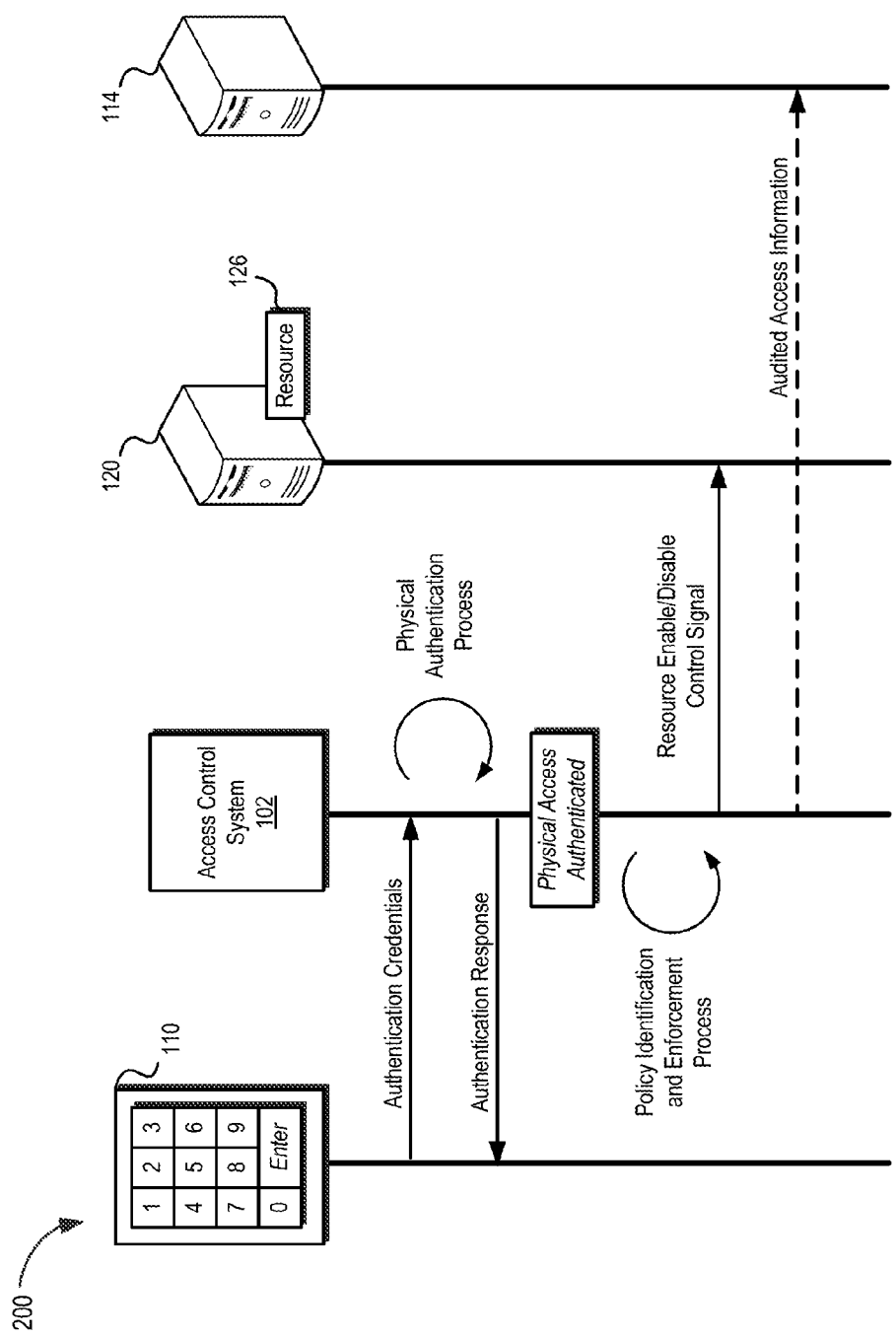
FIG. 2 illustrates a diagram showing an example of a resource management process consistent with embodiments disclosed herein.

FIG. 2 illustrates a diagram 200 showing an example of a resource management process consistent with embodiments disclosed herein. The resource management process may be used to manage access to and/or otherwise use of one or more resources 126 associated with equipment 120 included within a physical access-controlled area of a distributed site of an electric power generation and/or delivery system. As discussed above, a physical access control interface 110, an access control system 102 associated with the access-controlled area, and/or a remote authentication service 114 may be utilized in connection with management of the resource 126 consistent with embodiments of the disclosed systems and methods.

As illustrated, as part of a physical access authentication process for an access-controlled area, a user may enter authentication credentials (e.g., a PIN, password, and/or the like) via a physical access control interface 110. The authentication credentials may be communicated to an access control system 102 managing, among other things, physical access to the access-controlled area of the site. Upon receipt of the authentication credentials, the access control system 102 may perform an authentication process based on the authentication credentials and/or the authentication request. For example, the access control system 102 may compare a PIN included in the authentication credentials with known PINs associated with personnel having current access rights to the distributed site. Based on the results of the determination, the access control system 102 may communicate an authentication response indicating whether the authentication credentials provided by the user were authenticated and provide or deny associated physical access. In some embodiments, certain processes illustrated in connection with FIG. 2 as being performed by the access control system may be performed by a remote authentication service 114.

Upon authenticating physical access to the controlled area to the user, the access control system 102 and/or another associated system may engage in a policy identification and/or enforcement process. In certain embodiments, one or more policies may be identified that are associated with the user identified based on with the authentication credentials provided to the access control system 102. The one or more identified policies may then be enforced to manage resources 126 associated with equipment 120 included in the access-controlled area. For example, based on the one or more identified policies, one or more control signals may be generated by the access control system 102 and/or an associated system.

In certain embodiments, control signals generated by the access control system 102 may be configured to effectuate the policy determination relating to access to and/or use of the resources 126 in the access-controlled area by, for example, enabling and/or disabling certain resources 126. In further embodiments, audited access information relating to a user's access to and/or use of resources associated with the access-controlled area may be generated and/or transmitted from the access control system 102 to the remote authentication service 114 and/or another service.

Figure 3A:
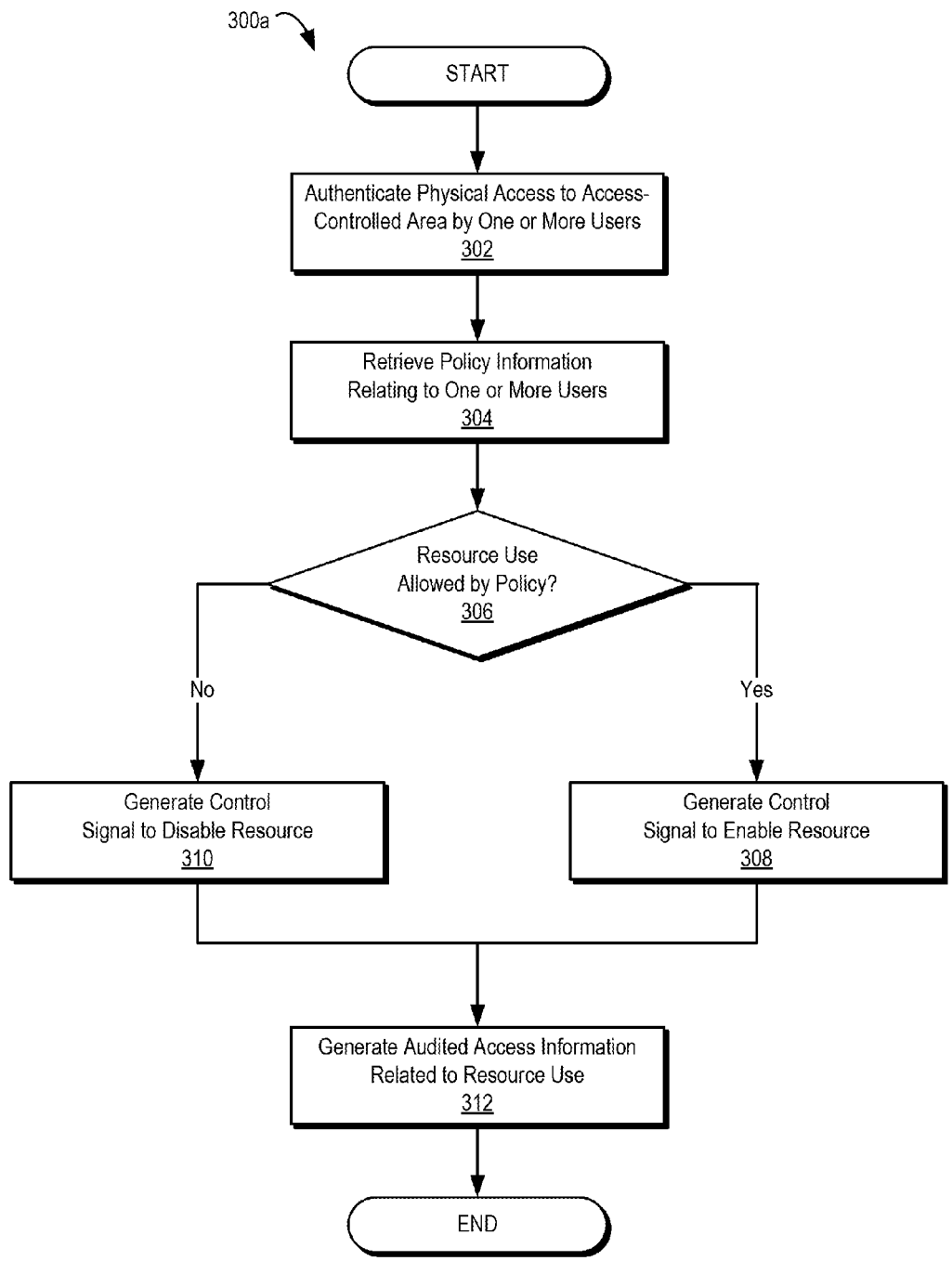
FIG. 3A illustrates a method of managing a resource consistent with embodiments disclosed herein.

FIG. 3A illustrates a method 300a of managing one or more resources associated with equipment included in an access-controlled area consistent with embodiments disclosed herein. In certain embodiments, elements of the method 300a may be performed by an access control system associated with a distributed site of an electric power generation and/or delivery system. In further embodiments, elements of the method 300a may be performed by a remote authentication system and/or any other suitable system and/or combination of systems.

At 302, one or more users may authenticate their right to physically access an access-controlled area of a site. In certain embodiments, this authentication process may involve a user providing authentication credentials (e.g., a PIN, password, and/or the like) to an access control system that may determine whether the authentication credentials are associated with an individual having current physical access rights to an associated distributed site.

Once physical access to the access-controlled area has been authenticated at 302, one or more policies may be identified and/or retrieved at 304 associated with the user that authenticated their physical-access to the access-controlled area. In some embodiments, the user and/or the associated policies may be identified based on the authentication credentials provided as part of the physical-access control authentication process. Consistent with the disclosed embodiments, policies may articulate, among other things, which resources within the access-controlled area the identified user may access and/or otherwise use, how such resources may be used, when such resources may be used, under what circumstances such resources may be used, and/or the like.

At 306, the one or more identified policies may be enforced as part of a policy enforcement process. In certain embodiments, this process may comprise determining whether use of and/or access to one or more resources associated with equipment included in the access-controlled is permitted based on the identity of the user that authenticated their physical access. If the access to and/or use of resource is permitted, a control signal may be generated at 308 and transmitted to the resource and/or the associated equipment to enable the resource. In certain embodiments, if a resource is already active and/or enabled prior to a physical authentication event, no control signal enabling access to and/or use of the resource may need be generated at 308. If the policy enforcement process results in a determination that access to and/or use of the resource is not permitted, a control signal may be generated at 310 and transmitted to the resource and/or the associated equipment to disable the resource. In some embodiments, if a resource is not active and/or disabled prior to a physical authentication event, no control signal may be needed to disable access to the resource.

In certain embodiments, data relating to physical access to an access-controlled area and/or associated access and/or use of resources within the area may be generated at 312. Such audited access information may comprise, without limitation, information regarding which user physically accessed the access-controlled area, what resources were accessible to them and/or were used by them, the nature of such use including any information generated during such use, and/or the like.

Figure 3B:
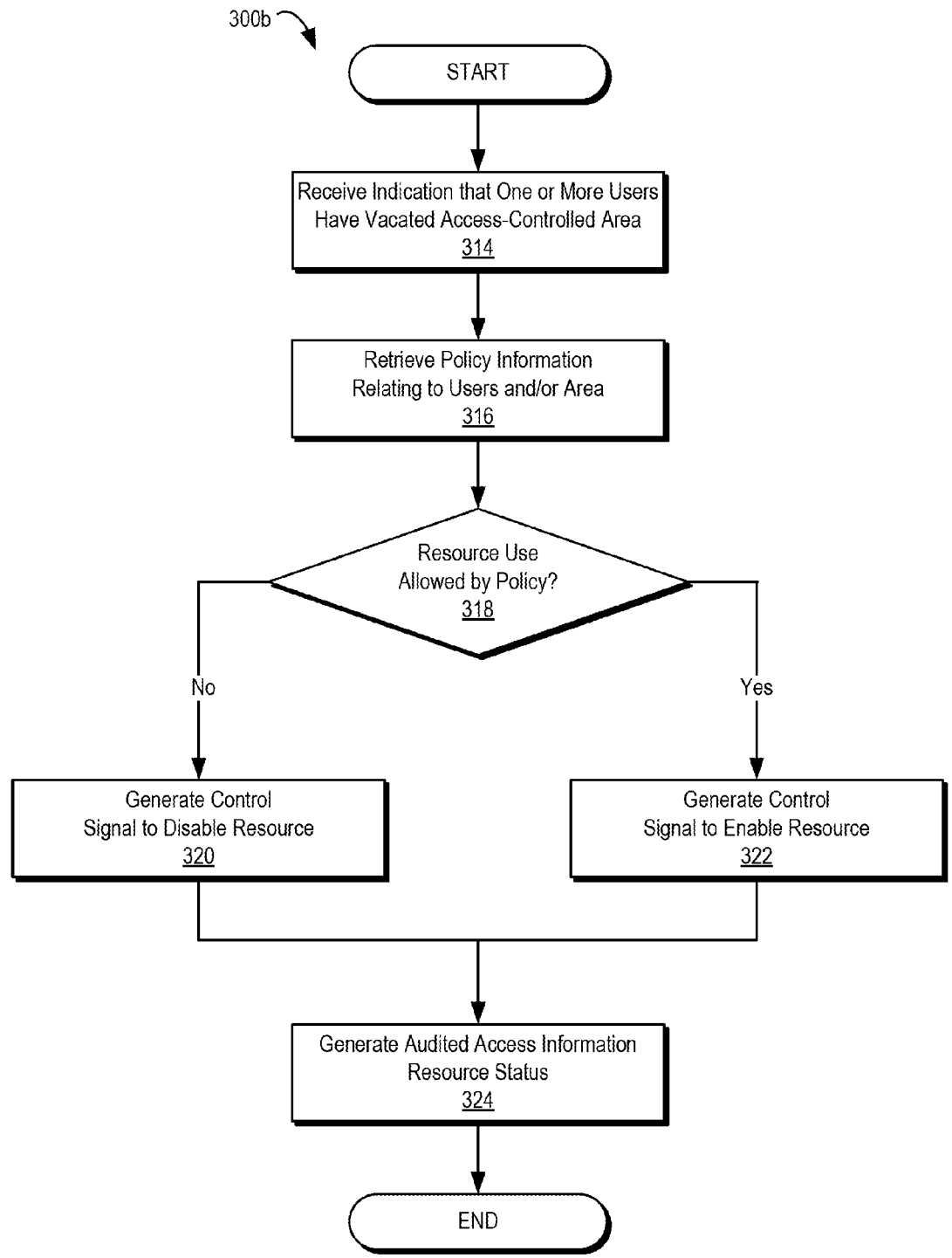
FIG. 3B illustrates another method of managing a resource consistent with embodiments disclosed herein.

FIG. 3B illustrates another method 300b of managing one or more resources associated with equipment included in an access-controlled area consistent with embodiments disclosed herein. Particularly, method 300b illustrates a method of managing resources associated with equipment included in an access-controlled area after one or more users have been determined to have vacated the access controlled-area. In certain embodiments, elements of the method 300b may be performed by an access control system associated with a distributed site of an electric power generation and/or delivery system. In further embodiments, elements of the method 300b may be performed by a remote authentication system and/or any other suitable system and/or combination of systems.

At 314, it may be determined that one or more users that were previously granted physical access to an access-controlled area of a site have vacated the access-controlled area. In certain embodiments, this determination may be made based on an explicit indication received from the one or more users. For example, in some embodiments, users may "badge out" and/or provide any other suitable electronic indication to an access control system indicating that they are vacating the access-controlled area.

In further embodiments, it may be passively determined that a user has vacated an access-controlled area based on information received from one or more sensors, systems, and/or equipment associated with the access controlled area (e.g., sensors associated with an access control point, sensors associated with the access-controlled area including, without limitation, motion and/or sound sensors, and/or the like). For example, a sensor associated with a door of an access-controlled area may indicate that a user has vacated the access-controlled area via the door. In another example, a motion sensor associated with an access-controlled area may provide information indicating that motion has not been detected within the access-controlled area for a particular period of time indicating a likelihood that the access-controlled area has been vacated. In yet another example, if resources and/or equipment included within an access-controlled area have not been accessed for a particular duration of time, an indication may be provided to an associated-access control system indicating a likelihood that the access-controlled area has been vacated. Based on any of the above information, it may be determined that the access-controlled area has been vacated.

One or more policies may be identified and/or retrieved at 316 associated with the user that vacated the access-controlled area and/or the access-controlled area itself. Consistent with the disclosed embodiments, policies may articulate, among other things, which resources within the access-controlled area may remain active while the access-controlled area is vacant and/or the like.

At 318, the one or more identified policies may be enforced as part of a policy enforcement process. In certain embodiments, this process may comprise determining whether one or more resources associated with equipment included in the access-controlled area should remain active while the access-controlled area is vacant. If the resources should remain active, a control signal may be generated at 322 and transmitted to the resource and/or the associated equipment to enable the resource. In certain embodiments, if a resource is already active and/or enabled prior to a physical authentication event, no control signal enabling access to and/or use of the resource may need be generated at 322. If the policy enforcement process results in a determination that a resource should not remain active, a control signal may be generated at 320 and transmitted to the resource and/or the associated equipment to disable the resource. In some embodiments, if a resource is not active and/or disabled prior to a physical authentication event, no control signal may be needed to disable access to the resource.

In certain embodiments, data relating to physical access to an access-controlled area and/or associated resources within the area may be generated at 324. Such audited access information may comprise, without limitation, information regarding which user(s) vacated access to the access-controlled area, what time such user(s) vacated the area, what actions were taken in connection with resources included within access-controlled area following the user(s) vacating the access-controlled area, and/or the like.

Figure 4:
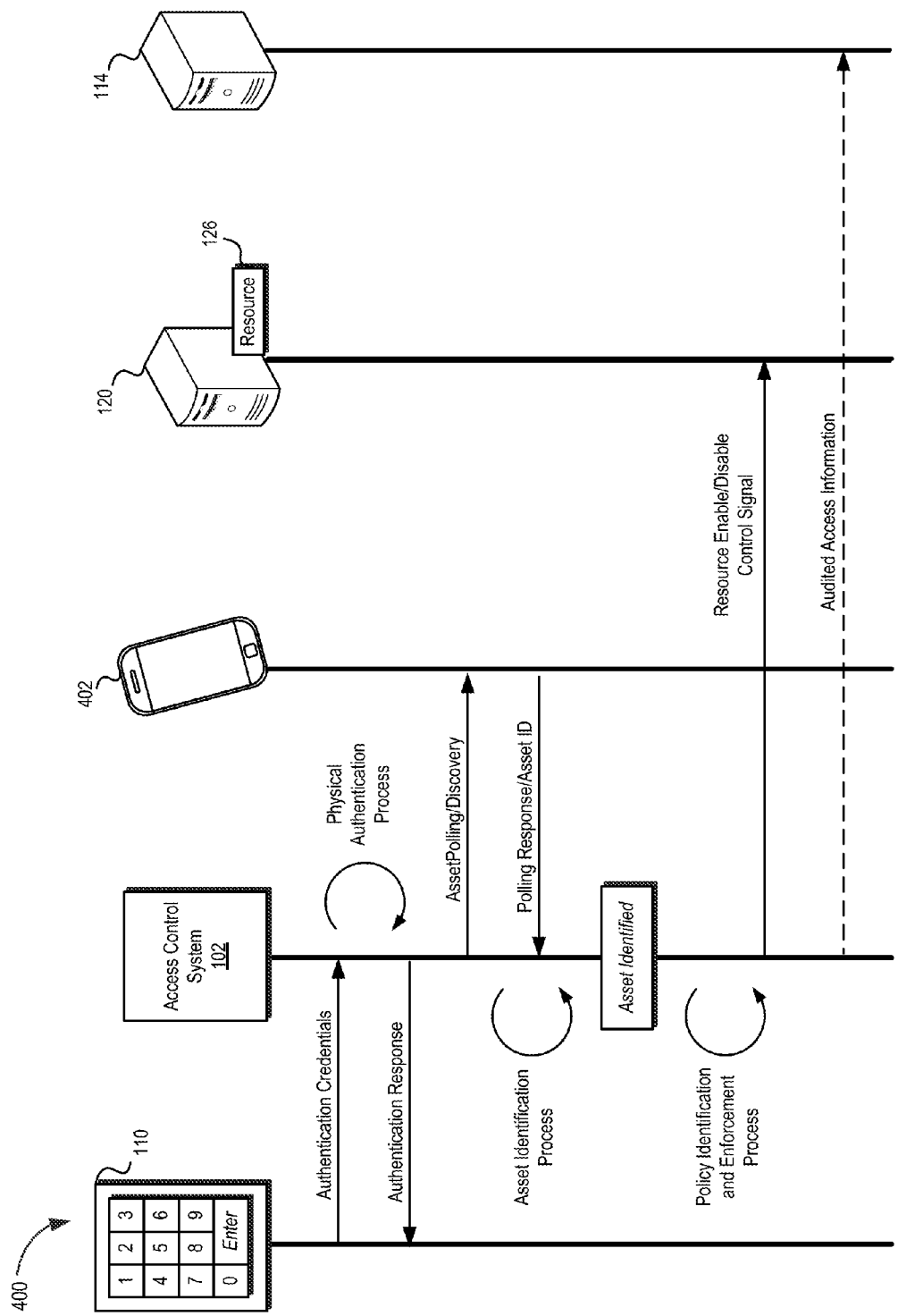
FIG. 4 illustrates a diagram showing an example of a resource management process based on identification of a transient asset within an access-controlled area consistent with embodiments disclosed herein.

FIG. 4 illustrates a diagram 400 showing an example of a resource management process based on identification of a transient asset 402 within an access-controlled area consistent with embodiments disclosed herein. In certain embodiments, a variety of physical and electronic security requirements may be associated with a distributed site. For example, electronic security requirements may require tracking and/or identification of transient assets (e.g., electronic devices and/or the like) brought within a secure access-controlled area of the distributed site. Such requirements may, among other things, allow a utility to track the location of its transient assets, to identify instances when unknown and/or unapproved transient devices may be brought within access-controlled areas, to associate unknown transient assets and/or devices with individuals allowed physical access to a distributed site, and/or to enforce policy and/or manage resources included within the access-controlled areas based on the presence of a transient asset.

As illustrated, as part of a physical access authentication process for an access-controlled area, a user may enter authentication credentials (e.g., a PIN, password, and/or the like) via a physical access control interface 110. The authentication credentials may be communicated to an access control system 102 managing, among other things, physical access to the access-controlled area of the site. Upon receipt of the authentication credentials, the access control system 102 may perform an authentication process based on the authentication credentials and/or the authentication request. For example, the access control system 102 may compare a PIN included in the authentication credentials with known PINs associated with personnel having current access rights to the distributed site. Based on the results of the determination, the access control system 102 may communicate an authentication response indicating whether the authentication credentials provided by the user were authenticated and provide or deny associated physical access.

Upon authenticating and allowing a user physical access to the access-controlled area, the access control system 102 may identify one or more transient assets 402 located within the access-controlled area as part of an asset polling and/or discovery process. As used herein, a transient asset 402 may comprise any asset, object, device, and/or the like that may be associated with a user. In certain embodiments, a transient asset 402 may comprise an electronic device including, without limitation, a smartphone, a tablet computer, a laptop computer, a cellular telephone, a wireless communication device (e.g., a radio transceiver, a pager, etc.), a storage device (e.g., a USB storage device and/or flash drive), test equipment, and/or any other electronic device that may be associated with and/or otherwise owned or possessed by a user.

In further embodiments, a transient asset 402 may comprise any physical object that may be electronically tagged and/or otherwise associated with a device allowing the asset 402 to be uniquely identified by the access control system 102 and/or another associated system. For example, in certain embodiments, the transient asset 402 may comprise any object affixed to a secure tag that may comprise and/or be capable of generating information that uniquely identifies the transient asset 402. In certain embodiments, the secure tag may comprise a NFC tag, a radio-frequency identification ("RFID") tag, a universal serial bus ("USB") token, a Bluetooth®-low energy ("BLE") device storing secure information, and/or the like.

In response to the polling and/or discovery process, identification information that uniquely identifies the transient asset 402 may be transmitted to the access control system 102 from the transient asset 402. The identification information may comprise any information that may uniquely identify the associated transient asset 402. For example, in some embodiments, the identification information may comprise a media access control ("MAC") address. In other embodiments, the identification information may comprise an universally unique identifier ("UUID") (e.g., a 128 bit value or the like), a globally unique identifier ("GUID"), a serial number, an unique identification marking, an UID marking, an item unique identification ("IUID"), an unique item identifier ("UII"), an electronic product code ("EPC"), an unique identifier ("UID") (e.g., as may be used in connection with NFC devices), a vendor identifier ("VID"), a product identifier ("PID"), a license number, and/or any other type of information that may identify the associated transient asset 402.

Based on the identification information received from the transient asset 402, the access control system 102 may identify the transient asset 402. In certain embodiments, this identification may comprise determining that the transient asset 402 is a known transient asset 402 (e.g., an asset associated with a particular authorized user, group, organization, and/or the like known to the access control system 102). In other embodiments, this identification may comprise determining that the transient asset 402 is an unknown transient asset 402.

Upon identifying the transient asset 402, the access control system 102 and/or another associated system may engage in a policy identification and/or enforcement process. In certain embodiments, one or more policies may be identified associated with the identified transient asset. The one or more identified policies may then be enforced to manage resources 126 associated with equipment 120 included in the access-controlled area. For example, based on the one or more identified policies, one or more control signals may be generated by the access control system 102 and/or an associated system.

In certain embodiments, control signals generated by the access control system 102 may be configured to effectuate the policy determination relating to access and/or use of the resources 126 in the access-controlled area by, for example, enabling and/or disabling certain resources 126. For example, a policy associated with unknown assets may articulate that if an unknown asset 402 is identified as being brought within the secure access-controlled area, access to resources 126 within the area should be disabled to prevent possible security breaches. Accordingly, the access control system 102 may generate and transmit control signals to one or more resources 126 configured to disable the resources 126. In further embodiments, audited access information relating to any access to and/or use of resources 126 included within the access-controlled area may be generated and/or transmitted from the access control system 102 to the remote authentication service 114 and/or another service.

Figure 5:
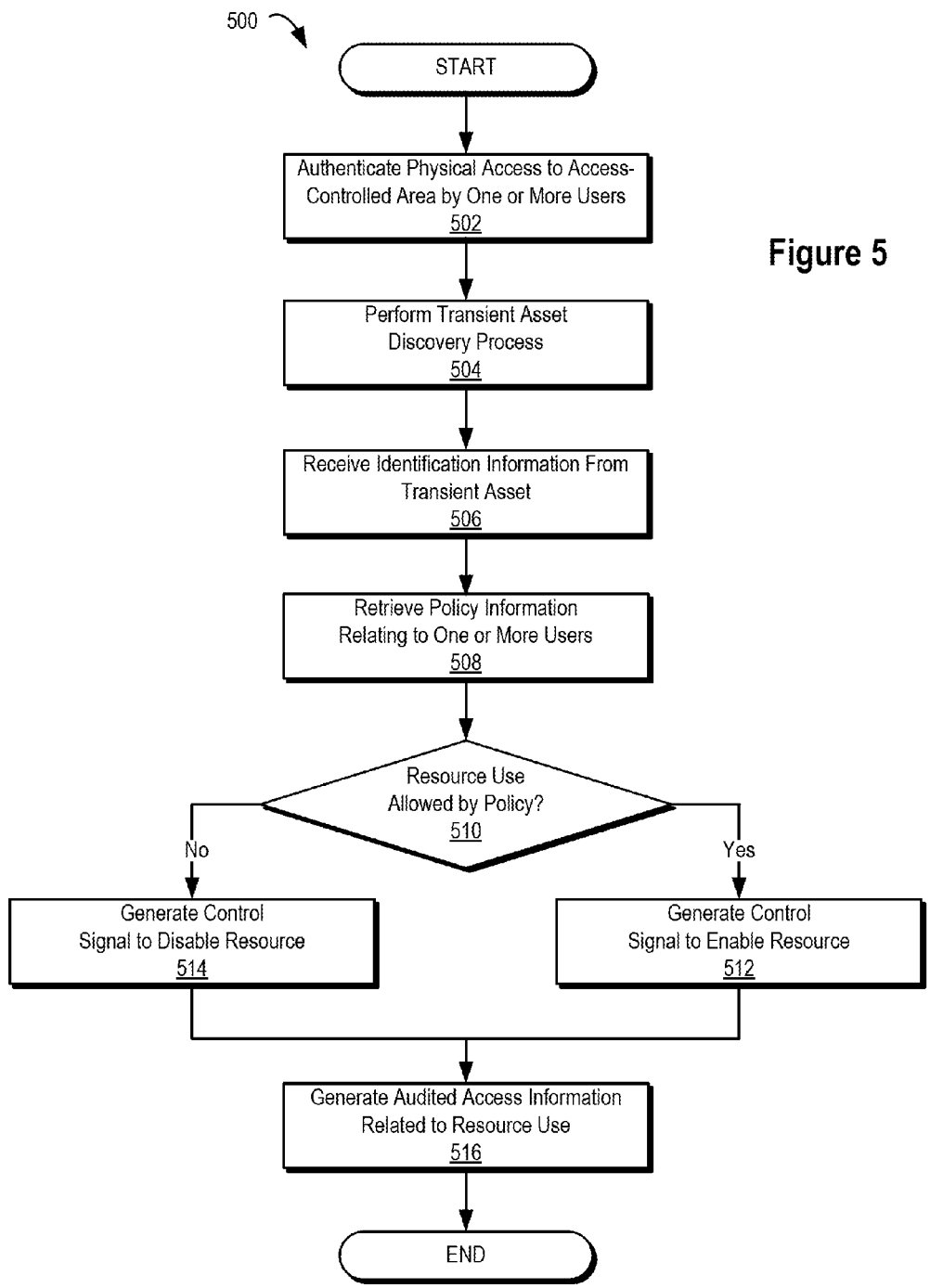
FIG. 5 illustrates a method of managing a resource based on identification of a transient asset within an access-controlled area consistent with embodiments disclosed herein.

FIG. 5 illustrates a method 500 of managing a resource based on identification of a transient asset within an access-controlled area consistent with embodiments disclosed herein. In certain embodiments, elements of the method 500 may be performed by an access control system associated with a distributed site of an electric power generation and/or delivery system. In further embodiments, elements of the method 500 may be performed by a remote authentication system and/or any other suitable system and/or combination of systems.

At 502, one or more users may authenticate their right to physically access an access-controlled area of a site. In certain embodiments, this authentication process may involve a user providing authentication credentials (e.g., a PIN, password, and/or the like) to an access control system that may determine whether the authentication credentials are associated with an individual having current physical access rights to an associated distributed site.

Once physical access to the access-controlled area has been authenticated at 502 and/or after a certain period has elapsed following an authentication event, a polling and/or discovery process may be initiated at 504 to identify one or more transient assets within the access-controlled area. In certain embodiments, the polling and/or discovery process may comprise a wireless polling process. In other embodiments, the polling and/or discovery process may comprise a process intimated when a user communicatively couples a transient asset to one or more wired and/or wireless communication interfaces included within an access-controlled area. For example, the polling and/or discovery process may occur when a user communicatively couples a USB storage device and/or a personal computer to associated interfaces included in systems and/or equipment included within an access-controlled area.

In some embodiments, the polling and/or discovery process may be performed, at least in part, using an interface configured to receive identify information from a transient asset. In certain embodiments, such an interface may comprise a scanner communicatively coupled to an access control system within and/or outside of the access-controlled area. For example, when a user authenticates their physical access rights using a physical access control interface (e.g., via a badge in process or the like), a transient asset scanning and/or registration interface may be used to communicate identification information from the transient asset to the access control system. In some embodiments, such a scanning and/or registration interface may be included within the physical access control interface. In further embodiments, the scanning and/or registration interface may be a separate interface located outside of and/or within the access-controlled area.

In response to the discovery and/or polling process, identification information that uniquely identifies a transient asset may be received at 506 (e.g., received by the access control system and/or another system implementing embodiments of the disclosed systems and methods). For example, in some embodiments, a MAC address uniquely identifying a transient asset may be received at 506, although other types of identification information may also be utilized in connection with the disclosed embodiments.

Based on an identified transient asset (e.g., identified based on the identification information received at 506), one or more policies may be identified and/or retrieved at 508 associated with the identified transient asset. Consistent with the disclosed embodiments, such policies may articulate, among other things, which resources within the access-controlled area may be available while the identified transient asset is located within the access-controlled area, how such resources may be used, when such resources may be used, under what circumstances such resources may be used, and/or the like.

At 510, the one or more identified policies may be enforced as part of a policy enforcement process. In certain embodiments, this process may comprise determining whether use of and/or access to one or more resources associated with equipment included in the access-controlled is permitted based on the transient asset being brought within the access-controlled area. If the access to and/or use of resource is permitted, a control signal may be generated at 512 and transmitted to the resource and/or the associated equipment to enable the resource. In certain embodiments, if a resource is already active and/or enabled prior to a physical authentication event, no control signal enabling access to and/or use of the resource may need be generated at 512. If the policy enforcement process results in a determination that access to and/or use of the resource is not permitted, a control signal may be generated at 514 at transmitted to the resource and/or the associated equipment to disable the resource. In some embodiments, if a resource is not active and/or disabled prior to a physical authentication event, no control signal may be needed to disable access to the resource.

In certain embodiments, data relating to physical access to an access-controlled area, identification of one or more transient assets, and/or associated access and/or use of resources within the area may be generated at 516. Such audited access information may comprise, without limitation, information regarding which user physically accessed the access-controlled area, what transient assets where brought within the access-controlled area, what resources were accessible to them and/or were used by them, the nature of such use including any information generated during such use, and/or the like.

Figure 6:
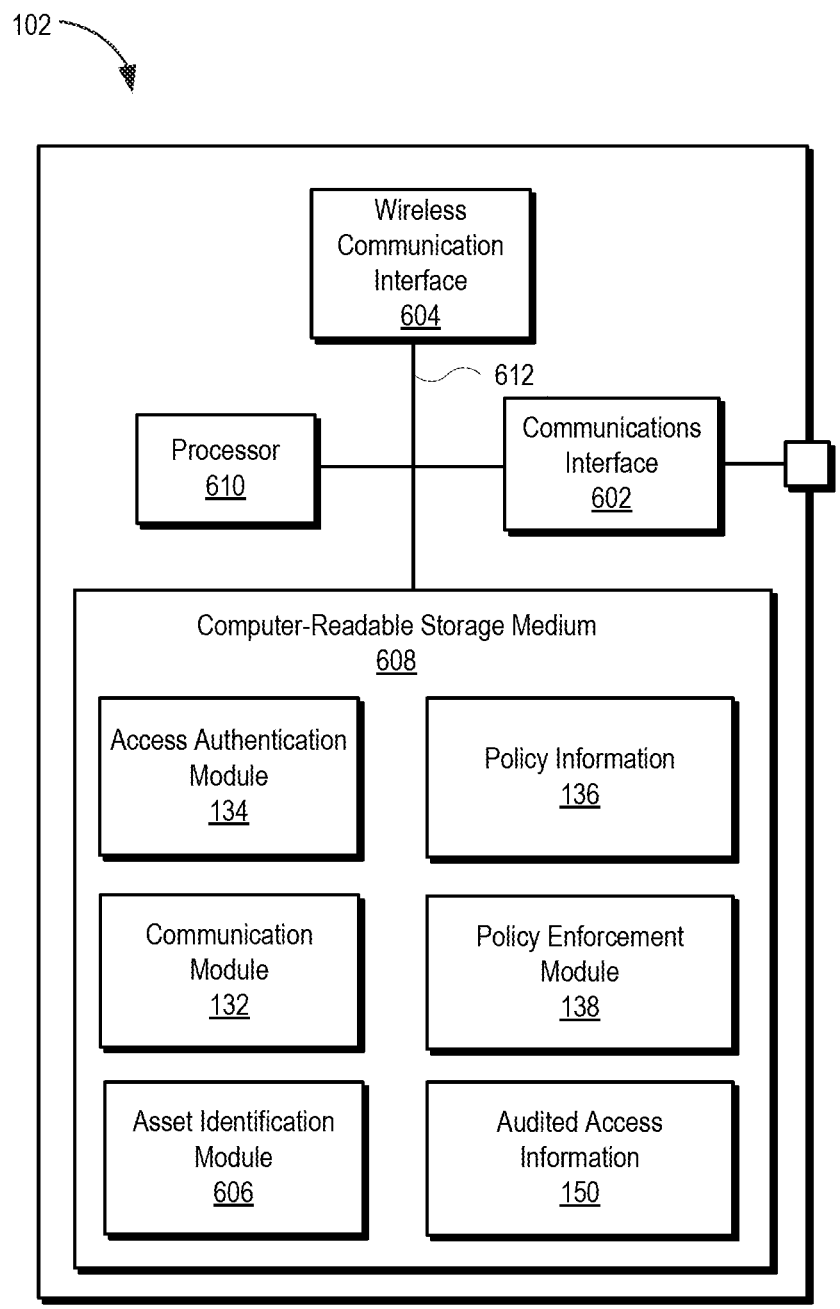
FIG. 6 illustrates a functional block diagram of a resource management system consistent with embodiments disclosed herein.

FIG. 6 illustrates a functional block diagram of an access control system 102 configured to manage one or more resources consistent with embodiments disclosed herein. In some embodiments, the access control system 102 may comprise an IED. Embodiments of the access control system 102 may be utilized to implement embodiments of the systems and methods disclosed herein. For example, the access control system 102 may be configured to manage one or more resources associated with various equipment included in an access-controlled area according to articulated policies associated with identified users gaining physical access to the access-controlled area and/or identified transient assets brought within the access-controlled area.

The access control system 102 may include a communications interface 602 configured to communicate with a communication network. In certain embodiments, the communications interface 602 may comprise a wired and/or wireless communication interface configured to facilitate communication with a network, other systems and/or devices, and/or mobile devices. For example, in some embodiments, the access control system 102 may be configured to securely communicate with a physical access control interface in connection with receiving authentication credentials from a user, to communicate with equipment in connection with issuing resource management control signals and/or receiving associated resource status information, and/or to receive identification information from one or more transient assets located within the access-controlled area.

A computer-readable storage medium 608 may be the repository of one or more modules and/or executable instructions configured to implement any of the processes described herein. A data bus 612 may link the communications interface 602, the wireless communication interface 604, and the computer-readable storage medium 608 to a processor 610. The processor 610 may be configured to process communications received via the communications interface 602. The processor 610 may operate using any number of processing rates and architectures. The processor 610 may be configured to perform various algorithms and calculations described herein using computer executable instructions stored on computer-readable storage medium 608.

The computer-readable storage medium 608 may be the repository of one or more modules and/or executable instructions configured to implement certain functions and/or methods described herein. For example, the computer-readable storage medium 608 may include one or more access authentication modules 134 configured to perform embodiments of the physical access authentication methods disclosed herein, one or more asset identification modules 606 configured to implement embodiments of the transient asset identification methods disclosed herein, and/or one or more policy enforcement modules 138 configured to perform embodiments of the policy identification and/or enforcement methods disclosed herein. The computer-readable medium 608 may further include a communication module 132, policy information 136, and/or audited access information 150.

The access authentication module 134 may perform physical access authentication processes consistent with embodiments disclosed herein. For example, as discussed above, in certain embodiments, the access authentication module 134 may implement a knowledge factor-based authentication process (e.g., a PIN authentication process) in connection with authenticating physical access to an access-controlled area of a distributed site. In certain embodiments, the physical access authentication module 134 may utilize authentication information (e.g., known authentication credentials associated with individuals having current access rights) managed by the access control system 102 and/or an associated remote system in connection with authentication determination processes.

A policy enforcement module 138 may identify one or more policies associated with a user and/or an identified transient asset (e.g., a policy included in policy information 136 or the like) and/or enforce such policy by generating one or more control signals to control the accessibility and/or use of one or more resources associated with the identified policies. For example, based on the identity of an authenticated user and/or an identified transient asset, the access control system 102 may generate one or more control signals to enable and/or disable access to and/or use of certain resources. In some embodiments, control signals and/or instructions issued by the access control system 102 control instructions may be only informative or suggestive, meaning that the receiving equipment is not obligated to perform the control instruction. Rather, the receiving equipment may use the suggested control instruction in coordination with its own determinations and information from other controllers to determine whether it will perform the control instruction. In other cases control instructions may be directive in that they are required actions. Differentiation between informative or suggestive control instructions and mandatory control instructions may be based on information included with the control instructions.

A communication module 132 may include instructions for facilitating communication of information from the access control system 102 to other controllers, systems, devices, resources, transient assets and/or other components in the electric power delivery system and/or a distributed site associated with the same. The communication module 132 may include instructions on the formatting of communications according to a predetermined protocol. Communication module 132 may be configured with subscribers to certain information, and may format message headers according to such subscription information.

While specific embodiments and applications of the disclosure have been illustrated and described, it is to be understood that the disclosure is not limited to the precise configurations and components disclosed herein. For example, the systems and methods described herein may be applied to a variety of distributed sites of an electric power generation and delivery system. It will further be appreciated that embodiments of the disclosed systems and methods may be utilized in connection with a variety of systems, devices, and/or applications utilizing physical access control systems and methods, and/or applications that are not associated with and/or are otherwise included in an electric power delivery system. Accordingly, many changes may be made to the details of the above-described embodiments without departing from the underlying principles of this disclosure. The scope of the present invention should, therefore, be determined only by the following claims.

What is claimed is:

1. An access control system associated with an access-controlled area of a distributed site of an electric power delivery system, the system comprising:
    a credential input interface configured to receive authentication credentials from one or more users;
    a communications interface communicatively coupled to equipment included within the access-controlled area, the equipment comprising at least one resource;
    a processor communicatively coupled to the credential input interface and the communications interface;
    a computer-readable storage medium communicatively coupled to the processor, the computer-readable storage medium storing instructions that when executed by the processor cause the processor to:
        determine whether the authentication credentials received by the credential input interface are associated with one or more users having physical access rights to the access-controlled area;
        generate, based on the determination, an access control signal configured to implement an access control action by an access control device associated with the access-controlled area allowing physical access to the one or more users;
        identify one or more resource management policies associated with the one or more users based on the authentication credentials, wherein identifying the one or more resource management policies comprises:
            determining an attribute associated with the one or more users based on the authentication credentials, and
            identifying the one or more resource management policies based on the attribute, the attribute comprising group membership information accessed from a directory service configured to manage computing domain networks accessed by the one or more users;
        generate at least one policy enforcement control signal based on the one or more identified resource management policies, the at least one policy enforcement control signal configured to manage access to the at least one resource by the one or more users; and
transmit, via the communications interface, the at least one policy enforcement control signal to the equipment.

2. The system of claim 1, wherein the at least one resource comprises a hardware resource.

3. The system of claim 2, wherein the hardware resource comprises at least one of a communications port, a status indicator light, a input interface, a display interface, and a processing environment.

4. The system of claim 1, wherein the at least one resource comprises a software resource.

5. The system of claim 4, wherein the software resource comprises at least one of an application, a graphical user interface, a communications protocol, a software process, and an information database.

6. The system of claim 1, wherein the equipment is in an operational state prior to determining whether the authentication credentials are associated with one or more users having physical access rights to the access-controlled area.

7. The system of claim 1, wherein the at least one policy enforcement control signal is configured to enable the at least one resource.

8. The system of claim 1, wherein the at least one policy enforcement control signal is configured to disable the at least one resource.

9. The system of claim 1, wherein identifying the one or more resource management policies further comprises:
   determining an identity of the one or more users based on the authentication credentials; and
   identifying the one or more resource management policies based further on the identity of the one or more users.

10. An access control system associated with an access-controlled area of a distributed site of an electric power delivery system, the system comprising:
    a credential input interface configured to receive authentication credentials from one or more users;
    a communications interface configured to receive identification information from one or more transient assets and being communicatively coupled to equipment included within the access-controlled area, the equipment comprising at least one resource;
    a processor communicatively coupled to the credential input interface and the communications interface;
    a computer-readable storage medium communicatively coupled to the processor, the computer-readable storage medium storing instructions that when executed by the processor cause the processor to:
       determine whether the authentication credentials received by the credential input interface are associated with one or more users having physical access rights to the access-controlled area;
       generate, based on the determination, an access control signal configured to implement an access control action by an access control device associated with the access-controlled area allowing physical access to the one or more users;
       receive, in response to a transient asset discovery process performed by the processor, identification information from the one or more transient assets located within the access-controlled area;
       identify one or more resource management policies associated with the one or more users, wherein identifying the one or more resource management policies comprises:
          determining an attribute associated with the one or more users based on the authentication credentials, and
          identifying the one or more resource management policies based on the attribute, the attribute comprising group membership information accessed from a directory service configured to manage computing domain networks accessed by the one or more users;
       generate at least one policy enforcement control signal based on the one or more identified resource management policies, the authentication credentials, and the identification information, the at least one policy enforcement control signal configured to manage access to the at least one resource; and
       transmit, via the communications interface, the at least one policy enforcement control signal to the equipment.

11. The system of claim 10, wherein the at least one resource comprises a hardware resource.

12. The system of claim 10, wherein the at least one resource comprises a software resource.

13. The system of claim 10, wherein the at least one policy enforcement control signal is configured to enable the at least one resource.

14. The system of claim 10, wherein the at least one policy enforcement control signal is configured to disable the at least one resource.

15. A method for managing at least one resource associated with equipment included in an access-controlled area of a distributed site of an electric power delivery system, the method comprising:
    receiving authentication credentials from one or more users;
    determining that the received authentication credentials are associated with one or more users having physical access rights to the access-controlled area;
    generating, based on the determination, a control signal configured to allow the one or more users physical access to the access-controlled area;
    identifying one or more resource management policies associated with the one or more users based on the authentication credentials, wherein identifying the one or more resource management policies comprises:
       determining an attribute associated with the one or more users based on the authentication credentials by accessing a directory service configured to manage computing domain networks accessed by the one or more users to determine group membership information associated with the one or more users, and
       identifying the one or more resource management policies based on the attribute;
    generating at least one policy enforcement control signal based on the one or more identified resource management policies, the at least one policy enforcement signal configured to manage access to the at least one resource by the one or more sources; and
    transmitting the at least one policy enforcement control signal to the equipment.

16. The method of claim 15, wherein the at least one resource comprises a hardware resource.

17. The method of claim 15, wherein the at least one resource comprises a software resource.

18. The method of claim 15, wherein the at least one policy enforcement control signal is configured to enable the at least one resource.

19. The method of claim 15, wherein the at least one policy enforcement control signal is configured to disable the at least one resource.

20. The method of claim 15, wherein identifying the one or more resource management policies further comprises:
   determining an identity of the one or more users based on the authentication credentials; and
   identifying the one or more resource management policies based further on the identity of the one or more users.

* * * * *